UNITED STATES PATENT OFFICE.

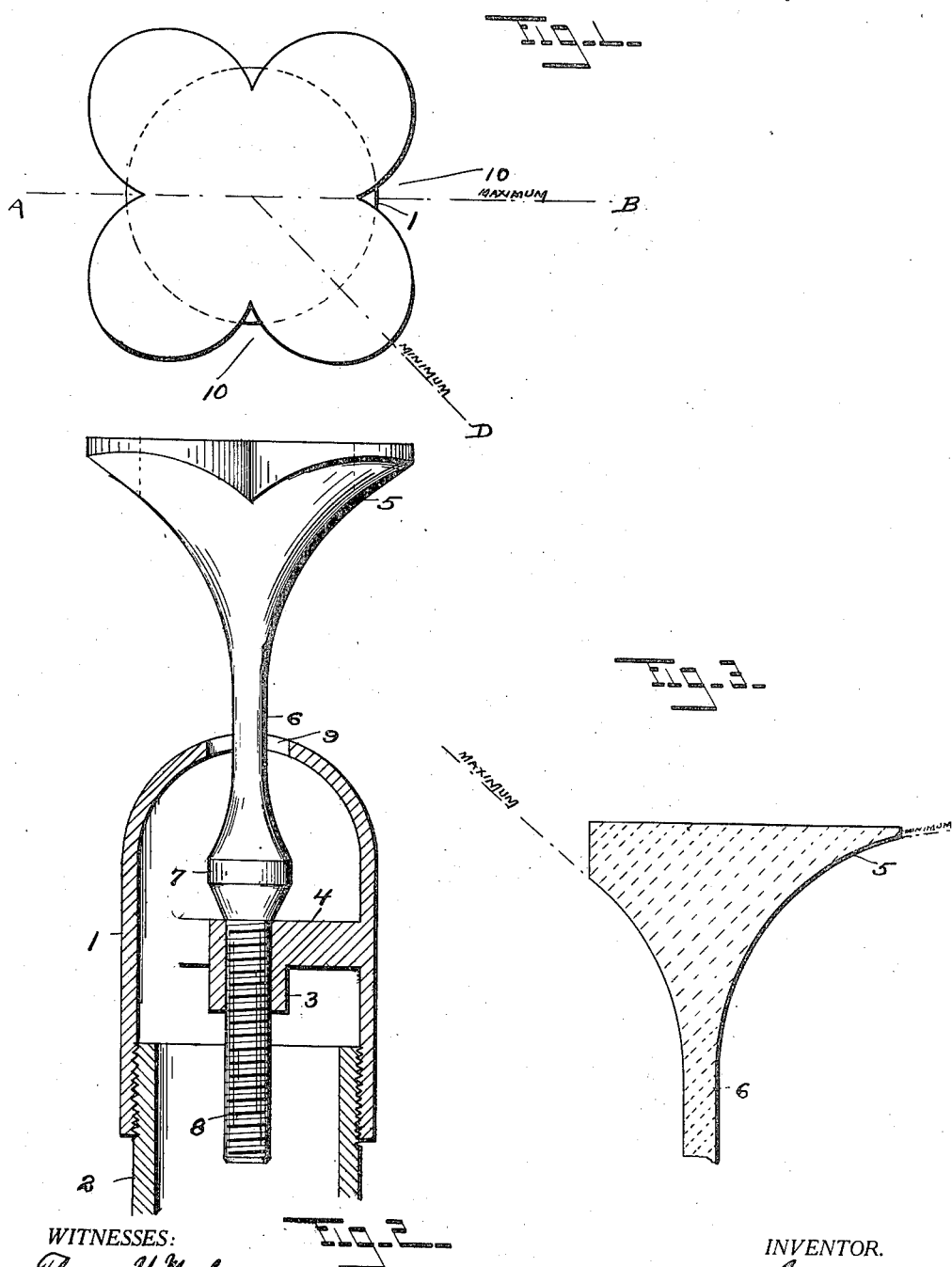

WILLIAM GAVIN TAYLOR, OF WATERBURY, CONNECTICUT.

DISTRIBUTING DEVICE.

960,732.  Specification of Letters Patent.  Patented June 7, 1910.

Application filed December 5, 1908. Serial No. 466,143.

*To all whom it may concern:*

Be it known that I, WILLIAM GAVIN TAYLOR, a citizen of the United States, residing at Waterbury, in the county of New Haven and State of Connecticut, have invented certain new and useful Improvements in Distributing Devices, of which the following is a specification, reference being had therein to the accompanying drawings.

My invention relates to new and useful improvements in distributing devices, and has for its object, among other things, to provide simple and effective means for distributing matter, in varying quantities, over the perimeter of a geometrical area with mechanism that can be produced at the minimum cost.

To these, and other ends, my invention consists in the distributing device, having certain details of construction and combinations of parts, as will be hereinafter described and more particularly pointed out in the claims.

Referring to the drawings, in which like numerals of reference designate like parts in the several figures; Figure 1 is a plan view of my improved device as especially adapted for distributing matter over the perimeter of a square surface; Fig. 2 is a sectional view thereof upon line A—B, the spreader being shown in elevation; and Fig. 3 is a sectional view of the spreader upon line A—D of Fig. 1.

My device is especially designed for distributing matter in a liquid or semi-liquid form, but it may be used equally as well for distributing solid matter when reduced to small particles, or in powdered form.

Devices for distributing matter over a circular area are in common use but have serious limitations. This is best illustrated in the use of a battery of such devices for distribution of sewage, etc., over a filtration bed wherein only about seventy-eight per cent. of the area thereof is covered, a loss in capacity that assumes serious proportions as the size of the bed is increased. An attempt has been made to overcome this difficulty by using a traveling distributer that moves over the bed from one end to the other, but this method has not proven economically practicable. In my invention all of these objections are eliminated, as the device is stationary and the matter therefrom is diffused over the perimeter of a geometrical area of any desired form.

In the drawings, the numeral 1 designates the dome which is separably secured to a riser 2, and within which a boss or hub 3 is concentrically held by one or more integral arms 4. The spreader 5 is an inverted cone integral with a stem 6 which passes through an orifice 9 in the dome 1, having a valve collar 7 thereon and terminating at its lower end in a shank 8 which is threaded through the boss 3. The periphery of the spreader 5 is serrated by reason of the notches 10, there being four notches to correspond with the four corners of the square.

In operation the matter to be distributed passes from the riser 2 into the dome 1 and through the orifice 9 engaging the under conical surface of the spreader 5 and by reason thereof thrown outwardly to fall by gravity. The horizontal distance which the matter travels after leaving the spreader depends upon the angle of elevation given it at the instant it leaves said spreader, and in my invention, by reason of the notches 10, a gradual gradation in the angles of elevation is provided for, so that upon diffusion of the matter as it leaves the spreader the proper proportion thereof will be thrown the required distance to cover the sides of the square, and while midway between these points on the diagonal lines, the matter will, by reason of its greater angle of elevation be thrown so as to fill in the corners of the square. This difference in the angle of gradation is illustrated by the broken lines in Fig. 3, marked "maximum" and "minimum", the line marked "maximum" indicating the path of the matter as it leaves the spreader with its maximum elevation, and is at the point on said spreader at the bottom of the notch 10, and being the highest elevation, will carry the matter farther from the spreader and fill out the corners of the square. The lowest angle of diffusion is indicated by the line marked "minimum" and extends from a point on the periphery of the spreader midway between two of the notches. At this point the matter is thrown the shortest distance and distributes the matter upon the outer edges of the square between the corners thereof.

In practice, when used for distributing sewage over a filtration bed, this device has demonstrated that, for all practical purposes, it covers the perimeter of a complete geometrical figure, which contacts with the geometrical figure, of the same shape and size which is next adjoining.

In Fig. 2 the device is shown with the maximum opening of the orifice 9, but the area of this opening may be materially reduced or closed entirely by adjustment of the valve collar 7 therein, the stem 6 being of varying diameters to the top of said collar.

There are minor changes and alterations that can be made within my invention, and I would therefore have it understood that I do not limit myself to the exact construction herein shown and described, but claim all that falls fairly within the spirit and scope of my invention.

Having described my invention, what I claim as new, and desire to secure by Letters Patent, is:—

1. A device for distributing matter over the perimeter of a geometrical figure, having a spreader, the angle between the outer surface of which and the axis gradually increases toward the base which is provided with notches, and the length of the longitudinal curve upon said surface varying at different points around the said axis.

2. A device for distributing matter over the perimeter of a geometrical figure, having a spreader, the angle between the outer surface of which and the axis gradually increases toward the base which is provided with notches, the length of the longitudinal curve upon said surface varying at different points around said axis, and the angle of inclination of the matter as it leaves said spreader being the least where said longitudinally curved surface is shortest.

3. A device for distributing matter over the perimeter of a geometrical figure, having a spreader that flares outwardly toward its base edge, which is provided with notches, whereby the said matter leaves the spreader at said notches at a less inclination to the axis thereof than at the other portions.

4. A device for distributing matter over the perimeter of a geometrical figure, having a spreader, wherein the angle between the outer surface and the axis thereof gradually increases toward the base edge, and notches in said base edge substantially parallel with the axis of said spreader, whereby said matter leaves said spreader at a less inclination to said axis at said notches than at any other point.

5. A device for distributing matter over the perimeter of a geometrical figure, having a spreader, wherein the angle between the outer surface and the axis thereof gradually increases toward the base edge, and notches in said base edge corresponding in number with the corners of said figure, whereby said matter leaves said spreader at a less inclination to said axis at said notches than at any other point.

6. A device for distributing matter over the perimeter of a geometrical figure, having a spreader, the angle between the outer surface of which and the axis gradually increasing toward the base, which is provided with notches, the length of the longitudinal curve upon said surface, which is continuous and unbroken throughout its entire length, varying at different points around the said axis.

In testimony whereof I affix my signature in presence of two witnesses.

WILLIAM GAVIN TAYLOR.

Witnesses:
 JAY H. HART,
 KATHARINE A. RUBEY.